United States Patent
Hamza et al.

(10) Patent No.: US 6,711,279 B1
(45) Date of Patent: Mar. 23, 2004

(54) OBJECT DETECTION

(75) Inventors: Ridha M. Hamza, Minneapolis, MN (US); Darren Duane Cofer, Minnentonka, MN (US)

(73) Assignee: Honeywell International Inc., Morristown, NJ (US)

( * ) Notice: Subject to any disclaimer, the term of this patent is extended or adjusted under 35 U.S.C. 154(b) by 635 days.

(21) Appl. No.: 09/716,002

(22) Filed: Nov. 17, 2000

(51) Int. Cl.$^7$ .................................................. G06K 9/00

(52) U.S. Cl. ...................................... 382/103; 348/152

(58) Field of Search ......................... 382/103, 141–144, 382/181, 282, 283; 348/135, 136, 143, 148, 149, 152

(56) References Cited

U.S. PATENT DOCUMENTS

| | | | | |
|---|---|---|---|---|
| 5,721,692 A | * | 2/1998 | Nagaya et al. ............... | 345/475 |
| 5,731,832 A | | 3/1998 | Ng ............................. | 348/155 |
| 5,953,055 A | | 9/1999 | Huang et al. ............... | 348/155 |
| 6,035,067 A | | 3/2000 | Ponticos ..................... | 382/226 |
| 6,088,468 A | * | 7/2000 | Ito et al. ...................... | 382/103 |
| 6,453,069 B1 | * | 9/2002 | Matsugu et al. ............ | 382/173 |

FOREIGN PATENT DOCUMENTS

| | | | |
|---|---|---|---|
| EP | 0747868 A | 12/1996 | |
| EP | 0833503 A | 4/1998 | |
| EP | 1168269 A2 | 5/2001 | |
| WO | 97/16807 | 5/1997 | .......... G08G/1/065 |
| WO | WO 0233671 A | 4/2002 | |

OTHER PUBLICATIONS

Aach, T., et al., "Statistical model–based change detection in moving video", *Signal Processing*, vol. 31, No. 2, pp. 165–180, Mar. 1993.

Hotter, M., et al., "Image Segmentation Based on Object Oriented Mapping Parameter Estimation", *Signal Processing*, vol. 15, No. 3, pp. 315–334, Oct. 1988.

Ostermann, J., "Modelling of 3D moving objects for an analysis–synthesis coder", *SPIE–SPSE: Symposium on Sensing and reconstruction of 3D objects and Scenes. Proc. SPIE 1260*, pp 240–249, Santa Clara, CA, Feb. 1990.

Ostermann, J., "Segmentation of image areas changed due to object motion considering shadows", *Multimedia Communications and Video Coding*, pp. 241–246, Y. Wang, Ed., New York: Plenum, 1996.

Skifstad, K., et al., "Illumination Independent Change Detection for Real World Image Sequences", *Computer Vision, Graphics, and Image Processing*, vol. 46, No. 3, pp. 387–399, Jun. 1989.

Stauder, J., "Segmentation of moving objects in presence of moving shadows", *Proc. Int. Workshop on Coding Techniques for Very Low Bit Rate Video*, Linkoping, Sweden, Jul. 28–30, 1997, pp. 41–44.

(List continued on next page.)

Primary Examiner—Yon J. Couso
(74) Attorney, Agent, or Firm—Kris T. Fredrick

(57) ABSTRACT

A method for object detection that utilizes a patterned background. Patterned backgrounds are chosen such that each reference image analyzed will have both light and dark pixels. The method calculates the difference between the expected value for the light pixels and the expected value of the dark pixels in the reference image. This difference is used to chose a threshold value. The difference in expected values for the corresponding pixels in a live image is calculated and compared to the threshold value. If the difference in expected values of the live image are less than the threshold value, object detection is indicated.

15 Claims, 4 Drawing Sheets

REF DARK REGIONS ARE LIGHT AREAS IN
DIFF WHERE OBJECT IS PRESENT, AND VICE-VERSA

Ref      Live      $\Delta(.,.)$

OTHER PUBLICATIONS

Stauder, J., et al., "Detection of Moving Case Shadows for Object Segmentation", *IEEE Trans. on Multimedia*, vol. 1., No. 1, pp. 65–76, Mar. 1999.

Venkatseh, S., "Dynamic Threshold Determination by Local and Global Edge Evaluation", *Graphical models and image procession*, vol. 57, No. 2, pp. 146–160, Mar. 1995.

Weszka, J.S., "SURVEY: A Survey of Threshold Selection Techniques", *Computer Graphics and image Processing 7*, pp 259–265, 1978.

Xiong, W., et al., "Efficient Scene Change Detection and Camera Motion Annotation for Video Classification", *Computer vision and image understanding*, vol. 71, No. 2, pp. 166–181, Aug. 1998.

International Electrotechnical Commission (IEC); "Development for the International Standards in the field of Safety of Machinery—A vision–based protective device (VBPD)"; Oct. 1, 2001; The Japanese National Commission for IEC/TC44.

* cited by examiner

OBJECT DETECTION

FIELD OF THE INVENTION

The present invention relates to object detection. More specifically, the present invention relates to the detection of objects in a user-defined area having a patterned background.

BACKGROUND OF THE INVENTION

Motion detection and object detection systems are known in the art. Frequently, such systems are used to monitor a user-defined area to detect whenever an object enters the area. The equipment needed to implement an object detection system is well known in the art. Such systems comprise an imaging device (typically a video camera) capable of capturing an image of the monitored area and a device for digitizing the captured images. The digitized images are then analyzed in an attempt to detect whether an object has entered the monitored area. There exist many different known methods and algorithms for analyzing digitized images for determining when an object has entered a monitored area. Two of the most common methods utilized are generally referred to as motion segmentation methods or change detection methods.

A change detection method of object detection in an image is accomplished by examining the difference between a current image and a reference image that contains only the static background of the monitored area or scene. A reference image can be thought of as a representation of the monitored area as it would appear if no transitory objects were in view. Change detection algorithms take two digitized images as input and return the locations in the field of view where differences between the images are identified. These differences may be caused by the motion of an object in the field of view, the addition or removal of an object from the scene, changes in illumination, or noise from the digitization process. The objective of change detection algorithms is to locate only the changes that are due to structural changes in the scene, that is, an object moving or the introduction or removal of an object in the scene.

However, many object detection systems are utilized in environments that cause shadows to be cast on the monitored area or zone or in environments that experience significant changes in ambient lighting conditions. Such environments are often found in industrial settings. Shadows may be caused by direct and/or diffuse illumination from the environment outside the monitored area. Objects moving near the monitored area may have their shadows cast into the monitored area. Additionally, shadows may change as the lighting conditions in the environment change. Changes in the lighting conditions may be due to changes in the amount of illumination or movement of the light source.

Object detection systems need to distinguish actual objects in a monitored area from shadows that are being cast into the area and changes in the ambient lighting conditions. Existing techniques have attempted to distinguish actual objects in a monitored area from shadows that are being cast into the area and changes in the ambient lighting conditions, but these existing techniques have enjoyed limited success. Therefore, a need continues to exist in the art for object detection systems and methods that are superior to existing systems and methods for distinguishing objects from shadows and changing lighting conditions.

SUMMARY OF THE INVENTION

The present invention provides for object detection that is superior to the prior art at distinguishing between objects that have moved into a monitored area and shadows that have been cast into the monitored area. A patterned background is utilized in the present invention. According to the present invention, portions of the patterned background are analyzed to determine whether an object exists in any of the portions. For purposes of the present specification, each portion of the patterned background is referred to as a mask window. Preferably, the size of the mask window is designed so that it is no larger than the approximate size of the smallest object for which detection is desired. Mask windows are overlapped in a manner so as to cover the area for which object detection is desired. The patterned background is designed so that each mask window contains both light areas and dark areas. In a preferred embodiment, the patterned background is designed so that in each mask window the amount of light area and amount of dark area is approximately equal.

The present invention takes advantages of certain phenomena that occur when, in accordance with the present invention, a live image is compared to a reference image exhibiting a patterned background. First, a difference image produced by subtracting the reference image from a live image containing an object will contain a complement or inverse image of the object. Second, live images containing shadows instead of objects tend to not produce any complements or inverse images in a difference image.

Because the overall background pattern and the position of each mask window are known and do not change during object detection, the background pattern within each mask window is known and is constant. Thus, certain calculations corresponding to each reference image can be made once during initialization of the object detection system and then used as constants during analysis of a live image. This use of constants calculated at initialization allows for faster image analysis at run time, which in turn allows image capture devices with faster frame rates to be used.

According to the present invention, an object is detected when the difference between the expected value for the brightness levels in the portion of the live image corresponding to the portion of the reference image containing light pixels and the expected value for the brightness levels in the portion of the live image corresponding to the portion of the reference image containing dark pixels is less than some threshold T. Stated another way, object detection is indicated whenever the following relationship holds:

$$(E[\text{Live}_L(x,y)] - E[\text{Live}_D(x,y)]) < T,$$

wherein $E[\text{Live}_L(x,y)]$ is the expected value for the brightness levels in the portion of the live image corresponding to the portion of the reference image containing light pixels, wherein $E[\text{Live}_D(x,y)]$ is the expected value for the brightness levels in the portion of the live image corresponding to the portion of the reference image containing dark pixels, wherein $0 < T < \gamma_{ref}$, wherein $\gamma_{ref} = (E[\text{Ref}_L(x,y)] - E[\text{Ref}_D(x,y)])$, wherein $E[\text{Ref}_L(x,y)]$ is the expected value of the brightness levels of the light pixels in the reference image and $E[\text{Ref}_D(x,y)]$ is the expected value of the brightness levels of the dark pixels in the reference image. In a preferred embodiment of the present invention, T is equal to about $\gamma_{ref}/2$.

As explained above, $\gamma_{ref}$ can be calculated once and T can be chosen once at the time when a system embodying the present invention is setup or initialized and then both $\gamma_{ref}$ and T can be used as constants throughout the operation of the system. Alternatively, the reference image could be updated periodically and new values for $\gamma_{ref}$ and T calculated. Updating the reference image periodically would allow for embodiments of the present invention to account for changes in the environment, such as a slight deterioration of the background pattern over time.

The present invention can be embodied in a monitoring system able to detect the intrusion of people (or other objects) into a user-defined safety zone. The present invention provides superior methods for distinguishing between objects actually entering the user-defined area and shadows caused to be cast onto the user-defined area by changes in lighting or objects moving near the user-defined area.

DETAILED DESCRIPTION OF THE INVENTION

Unless indicated otherwise, the term "image" used in the current specification will refer to a digitized image having an array or vector of numbers representing brightness (that is, luminance intensity) levels. Each brightness level ranges from 0 (the darkest) to $I_{max}$ (the brightest). In embodiments of the present invention, the actual numerical intensity levels may range from 0 to 1.0 or from 0 (00000000 in binary notation) to 255 (11111111 in binary notation), for example, depending on the specific equipment utilized. Equipment for digitizing images and converting to arrays of brightness levels is well known in the art. The numerical brightness levels are frequently referred to as pixels.

According to the present invention, each captured image of the monitored area is divided up into portions or segments. These portions or segments are referred to as mask windows. The size of each mask window is chosen so that it is no bigger than the approximate size of the smallest object for which detection is desired. This is referred to as the target size. The present invention can detect objects smaller than the mask window, but the smaller an object is relative to the mask window, the lower the probability will be that the object will be detected. Thus, the size of objects to be detected are preferably at least as big as the area represented by the mask window.

Positions of mask windows are chosen so that the entire area to be monitored is covered by overlapping mask windows. Preferably, each mask window overlaps at least one other mask window. More preferably, each mask window overlaps approximately one half of at least one other mask window.

For each captured image of the monitored area, the image corresponding to each mask window is analyzed for object detection. Generally, object detection according to the present invention can be implemented on standard hardware known to one of ordinary skill in the art to operate sufficiently fast to complete analysis of all window masks for each capture image before the next image of the monitored area is captured.

Figure 1:
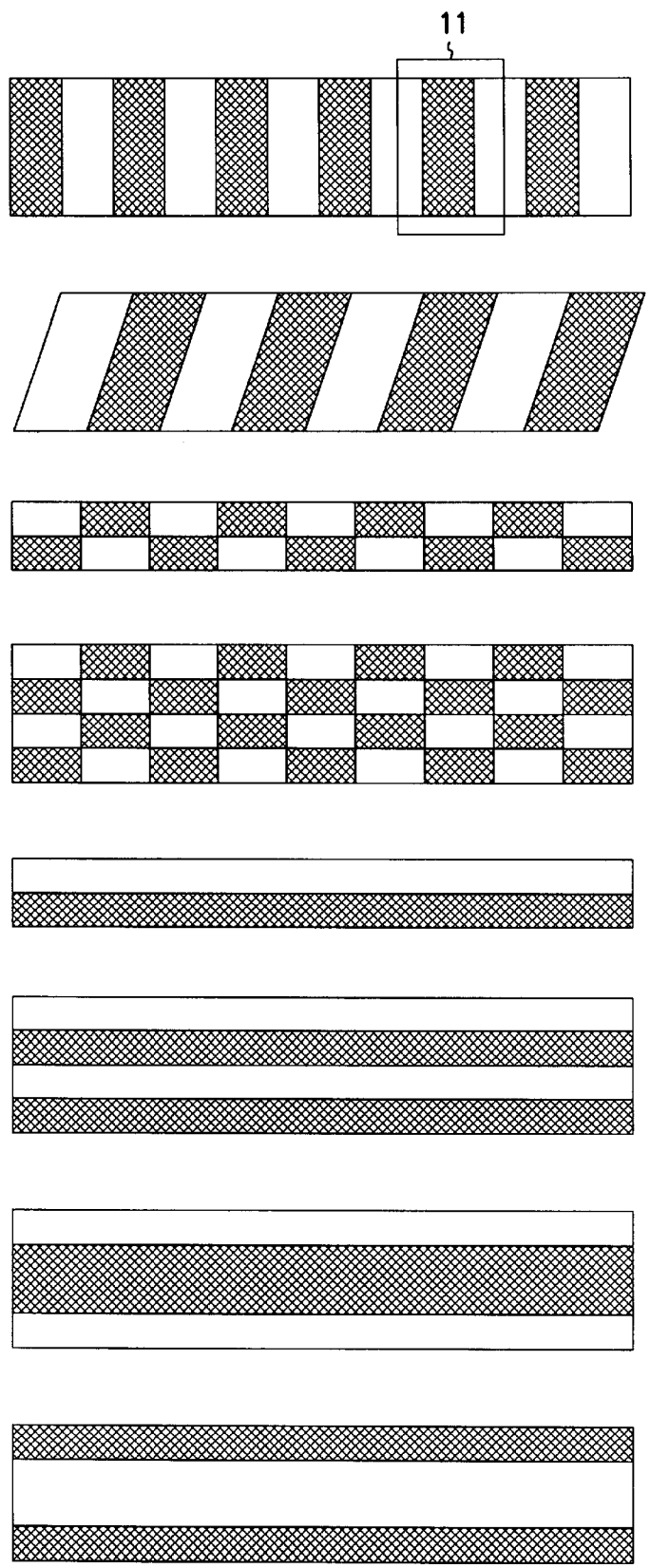
FIG. 1 depicts examples of patterns useful in the present invention.

The present invention provides for improved object detection in monitored areas having a patterned background. The patterned background is designed so that each mask window contains both light areas and dark areas. In a preferred embodiment, the patterned background is designed so that in each mask window the amount of light area and amount of dark area is approximately equal. FIG. 1 depicts examples of patterns useful in the present invention. The light and dark areas of a pattern are designed so that the brightness value or intensity level of the image pixels corresponding to the light areas is substantially greater than the brightness value or intensity level of the image pixels corresponding to the dark areas. The image pixels corresponding to the dark areas will all have values much less than $I_{max}$, and preferably, they will all have values close to zero. Similarly, the image pixels corresponding to the light areas will all have values much greater than zero, and preferably, they will all have values close to $I_{max}$.

Figure 2:
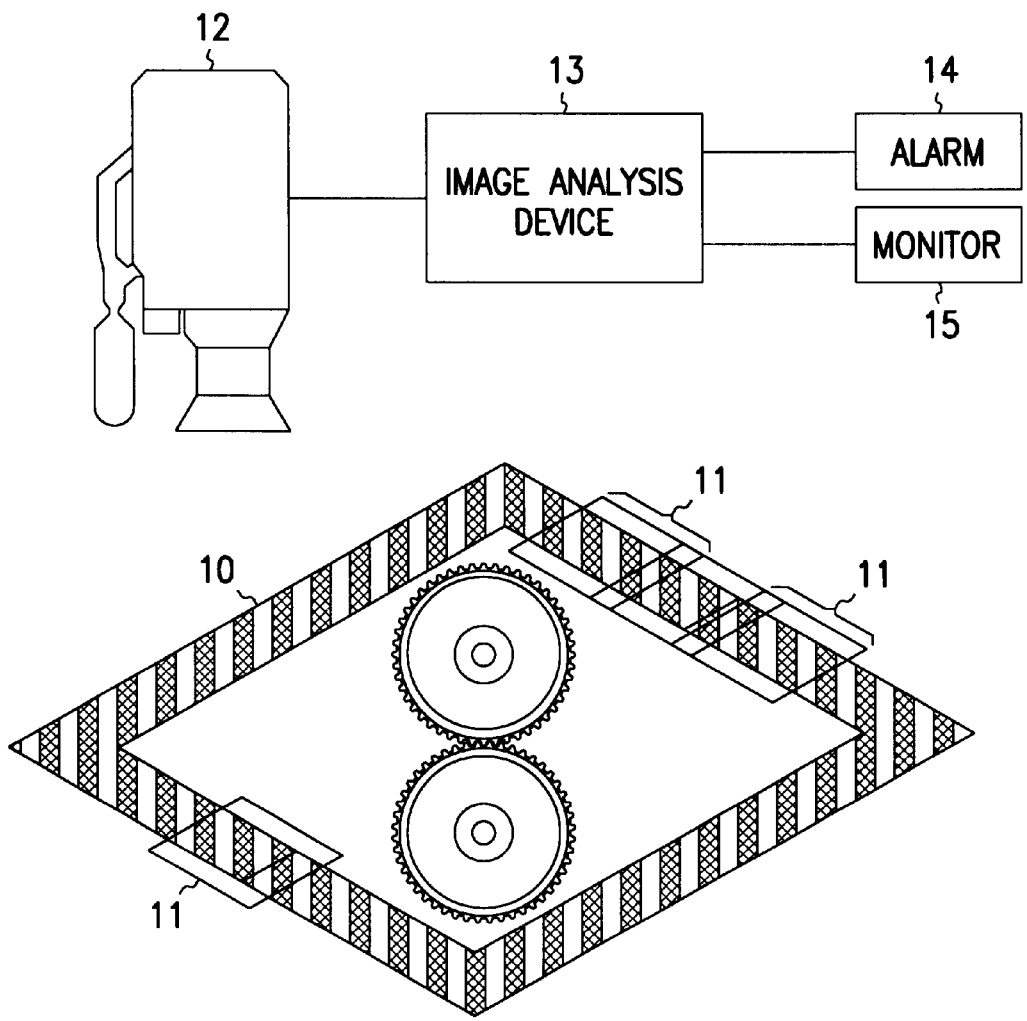
FIG. 2 depicts an embodiment of the present invention.

One embodiment of the present invention utilizes a patterned area surrounding an area into which objection detection is desired. An example of such an embodiment is depicted in FIG. 2 along with three overlapping mask windows 11. In actual operation, the number of mask windows 11 would be sufficient to allow the entire patterned background to be monitored for objects. Each mask window 11 is analyzed for the presence of objects. It is assumed that no object can enter the surrounded area without passing through the patterned area. Thus, if no object is detected in any of the mask windows 11, then no object will have been detected in the patterned area and it can be assumed that no object has entered the surrounded area.

FIG. 2 also shows an image capturing device 12, an image analysis device 13, and two different types of warning devices: an alarm 14 and a monitor 15. Image capturing devices 12 useful in the present invention are known in the art. Image capture device 12 may be a camera or other device capable of capturing an image. Various attachments can be used with image capture device 12 to enhance or modify the manner in which an image is captured. For example, a telescopic lens attached to image capture device 12 enables the monitoring of an area at a significant distance from the image capture device 12. Generally, images captured by the image capturing device 12 are analyzed, and stored if necessary, in the image analysis device 13. Image analysis devices 13 useful in the present invention can be any devices capable of carrying out the calculations required by the present invention. For example, the image analysis device 13 can be a computing device, such as a personal computer, programmed to carry out the needed calculations. In one embodiment, the image capture device 12 and the image analysis device 13 reside in the same hardware. For example, the image capture device 12 can be a camera having an on-board or embedded microprocessor used as an image analysis device 13. If an object is detected an appropriate signal or indication is made. The signal can take the form of sounding and alarm 14 or displaying information on a monitor 15.

The embodiment depicted in FIG. 2 can be effectively utilized in an industrial setting, for example, where the area of interest is a portion of a floor, perhaps containing potentially hazardous equipment. A pattern according to the present invention can be painted on the floor surrounding the area of interest. An imaging device is then placed in a position (on the ceiling, for example) such that the patterned area can be monitored for objects. If an object is detected in the patterned area, an alarm can be sounded or the potentially hazardous equipment shut down.

The present invention takes advantage of certain characteristics or phenomena about the difference between a current or live image and a reference image. A difference image can be calculated by subtracting the brightness level of the reference image from the brightness level of the live image at each pixel. The calculation of a difference image can be represented by the following equation:

$$\text{Diff}(x,y) = \text{Live}(x,y) - \text{Ref}(x,y)$$

where Live(x,y) represents the brightness level at position (x,y) in a live image, Ref(x,y) represents the brightness level at the same position (x,y) in the reference image, and Diff(x,y) represents the difference between these two brightness levels.

Figure 3:
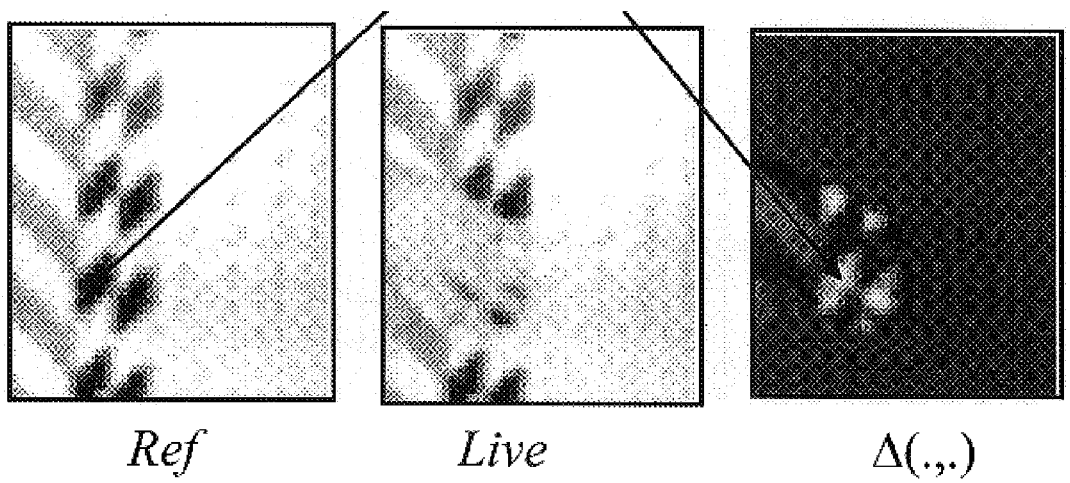
FIG. 3 depicts a reference image, a live image containing an object (that is, a hand), and a reference image produced in accordance with the present invention.

According to the present invention, the following phenomena is utilized. Whenever an object is located in the live image at a position (x,y), Diff(x,y) will be the complement of Ref(x,y). That is, if Ref(x,y) is a light pixel (that is, has a high brightness level) then Diff(x,y) will have a lower brightness level than Ref(x,y) and if Ref(x,y) is a dark pixel then Diff(x,y) will have a higher brightness level than Ref(x,y). Accordingly, Diff(x,y) will be the complement or inverse of Ref(x,y) when an object is present in the live image. This phenomena is shown in FIG. 3 and can be further explained in the following manner:

Let $I_L$=value of Ref(x,y) when Ref(x,y) is a light pixel,
Let $I_D$=value of Ref(x,y) when Ref(x,y) is a dark pixel, and
Let l=the value of Live(x,y). Then,
Diff(x,y)=(l-$I_L$) if Ref(x,y)=$I_L$
Diff(x,y)=(l-$I_D$) if Ref(x,y)=$I_D$ Since $I_D < I_L$, the following inequality holds $$(l-I_D) > (l-I_L), \forall l$$

According to the present invention, the following phenomena is also utilized. Let $\text{Diff}_L(x,y)$ be that portion of the difference image corresponding to the position where the pixels in Ref(x,y) are light and let $\text{Diff}_D(x,y)$ be that portion of the difference image corresponding to the position where the pixels in Ref(x,y) are dark. When an object has entered the mask window the expected value (typically calculated as the average value) of the values in $\text{Diff}_L$ should be less than the expected value of the values in $\text{Diff}_D$. This is expressed as follows:

$$\exists \text{ an object} \rightarrow E[\text{Diff}_L(x,y)] < E[\text{Diff}_D(x,y)],$$

where $E[\text{Diff}_L(x,y)]$ is the expected value of the pixels in $\text{Diff}_L(x,y)$ and $E[\text{Diff}_D(x,y)]$ is the expected value of the pixels in $\text{Diff}_D(x,y)$. Equivalently, this can be expressed as follows:

$$E[\text{Diff}_L(x,y)] \geq E[\text{Diff}_D(x,y)] \rightarrow \not\exists \text{ an object}$$

This equation can be rearranged to produce the following:

$$(E[\text{Live}_L(x,y)] - E[\text{Live}_D(x,y)]) \geq (E[\text{Ref}_L(x,y)] - E[\text{Ref}_D(x,y)]) \rightarrow \not\exists \text{ an object}$$

where $\text{Live}_L(x,y)$ is that portion of the live image corresponding to the position where the pixels in Ref(x,y) are light and let $\text{Live}_D(x,y)$ be that portion of the live image corresponding to the position where the pixels in Ref(x,y) are dark. Since Ref(x,y) is known and is constant, the expected value of $\text{Ref}_L(x,y)$, $E[\text{Ref}_L(x,y)]$, is only required to be calculated once. This calculation can be done during the configuration or initialization of the system prior to operating the system. Similarly, $E[\text{Ref}_D(x,y)]$ can be calculated once and then used whenever needed. Let the constant $(E[\text{Ref}_L(x,y)] - E[\text{Ref}_D(x,y)])$ be represented as $\gamma_{ref}$. The above equation then becomes:

$$(E[\text{Live}_L(x,y)] - E[\text{Live}_D(x,y)]) \geq \gamma_{ref} \rightarrow \not\exists \text{ an object}$$

The present invention also utilizes another phenomenon. If a shadow falls on a pattern of the present invention it will darken all pixels to some degree, but will not cause lighter pixels to have intensity values lower than the darker pixels. That it, the expected value of the light pixels in a live image, $E[\text{Live}_L(x,y)]$, should be greater than the expected value of the dark pixels in a live image, $E[\text{Live}_D(x,y)]$, even when there is a shadow in the mask window. This observation can be expressed by the following equation.

$$(E[\text{Live}_L(x,y)] - E[\text{Live}_D(x,y)]) < 0 \rightarrow \exists \text{ an object})$$

The two equations above cover all cases except those covered by the following equation.

$$0 < (E[\text{Live}_L(x,y)] - E[\text{Live}_D(x,y)]) < \gamma_{ref}$$

In an ideal world, the above condition would be considered an object intrusion since the difference in expected values found in the live image is less than the difference in expected values found in the reference image, namely $\gamma_{ref}$. However, this analysis of the above condition does not address any noise effects. Taking noise effects into consideration in conjunction with the above three equations, an object is detected when the difference in expected values is less than some threshold T, where the value of T is greater than 0 and less than $\gamma_{ref}$.

Thus, according to the present invention, an object is detected when $$(E[\text{Live}_L(x,y)] - E[\text{Live}_D(x,y)]) < T,$$

where $0 < T < \gamma_{ref}$. In a preferred embodiment of the present invention, T is equal to about $\gamma_{ref}/2$. Values of T may be optimized for specific applications without undue experimentation.

Once an object is detected, the present invention can indicate or signal that an object has been detected in any number of ways known in the art. For example, a system according to the present invention could send a signal to an alarm system.

Figure 4:
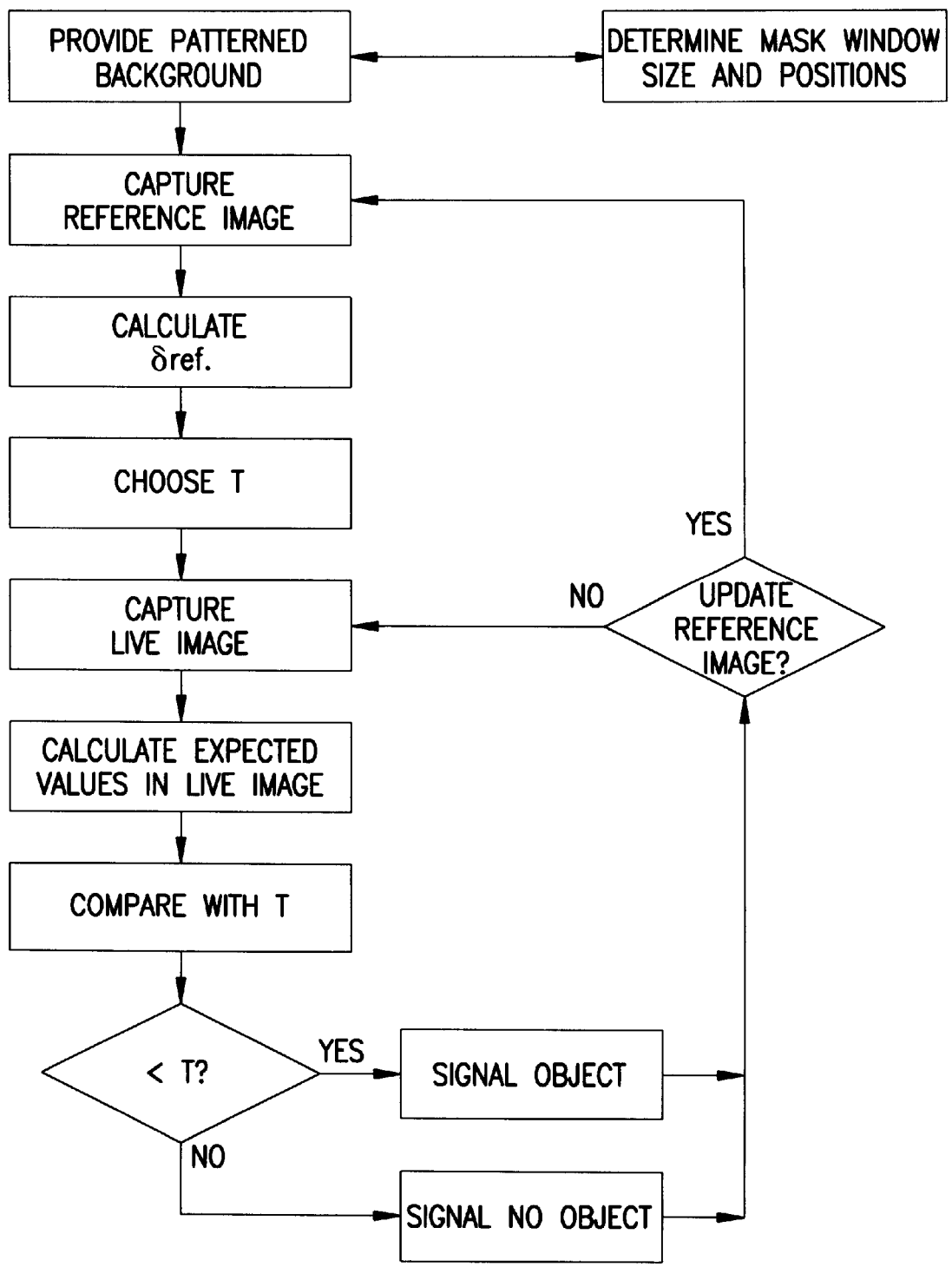
FIG. 4 shows a flowchart embodying a method according to the present invention.

FIG. 4 shows a flowchart embodying a method according to the present invention. It should be understood that FIG. 4 is intended to be illustrative, not restrictive. Many other embodiments of the present invention will be apparent to those of skill in the art. For example, the particular sequence of steps depicted in FIG. 4 does not imply any temporal ordering of their execution in the broadest embodiments of the present invention.

What is claimed is:

1. A method for detecting an object in an area, comprising:
   a) capturing a reference image of a patterned background having both light areas and dark areas;
   b) calculating a value $\gamma_{ref}$ representing the difference between the expected value of the brightness levels corresponding to the light areas in the reference image and the expected value of the brightness levels of the dark areas in the reference image;
   c) capturing a live image;
   d) calculating a value representing the difference between the expected value for the brightness levels in the live image corresponding to the light area of the reference image and the expected value for the brightness levels in the live image corresponding to the dark areas in the reference image; and
   e) indicating an object has been detected when the value calculated in d) is less than a threshold T, where $0 < T < \gamma_{ref}$.

2. A method according to claim 1, wherein the patterned background contains an approximately equal amount of light areas and dark areas.

3. A method according to claim 1, wherein the size of the captured images are no bigger than the approximate size of the smallest object for which detection is desired.

4. A method according to claim 1, wherein T is equal to about $\gamma_{ref}/2$.

5. A method according to claim 1, wherein steps c), d), and e) are each performed two or more times for each time steps a) and b) are performed.

6. A method for detecting an object in an area, comprising:
 a) capturing reference images for each of a plurality of area portions, the plurality of area portions covering the area, each portion having both light areas and dark areas;
 b) for each reference image, calculating a value $\gamma_{ref}$ representing the difference between the expected value of the brightness levels corresponding to the light areas in the reference image and the expected value of the brightness levels of the dark areas in the reference image;
 c) for each reference images, capturing a corresponding live image from the same area portion from which the reference image was captured;
 d) for each pair of reference images and corresponding live image, calculating a value representing the difference between the expected value for the brightness levels in the live image corresponding to the light areas of the reference image and the expected value for the brightness levels in the live image corresponding to the dark areas in the reference image; and
 e) indicating an object has been detected when the value calculated in d) for any pair of images is less than a threshold T, where $0<T<\gamma_{ref}$.

7. A method according to claim 6, wherein each of the plurality of area portions contains approximately equal amounts of light areas and dark areas.

8. A method according to claim 6, wherein the size of the area portions is no bigger than the approximate size of the smallest object for which detection is desired.

9. A method according to claim 6, wherein T is equal to about $\gamma_{ref}/2$.

10. A method according to claim 6, wherein steps c), d), and e) are each performed two or more times for each time steps a) and b) are performed.

11. A method according to claim 6, wherein each of the plurality of area portions overlaps at least one other area portion.

12. A method according to claim 6, wherein each of the plurality of area portions overlaps about one half of at least one other area portion.

13. A method according to claim 6, wherein the area comprising the plurality of area portions surrounds a second area.

14. An object detection system, comprising:
 a) an image capture device adapted to capture reference images of a patterned background having both light areas and dark areas, and further adapted to capture live images; and
 b) an image analysis device adapted to calculate a value $\gamma_{ref}$ representing the difference between the expected value of the brightness levels corresponding to the light areas in a reference image and the expected value of the brightness levels of the dark areas in the reference image, further adapted to calculate a value D representing the difference between the expected value for the brightness levels in a live image corresponding to the light area of the reference image and the expected value for the brightness levels in the live image corresponding to the dark areas in the reference image, and further adapted to indicate an object has been detected when the value D is less than a threshold T, where $0<T<\gamma_{ref}$.

15. An object detection system according to claim 14, wherein T is equal to about $\gamma_{ref}/2$.

* * * * *